Figure 5:
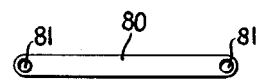

May 8, 1962     O. W. SMITH     3,033,400
POWER LIFT FOR TRAILER
Filed May 16, 1960     2 Sheets-Sheet 1
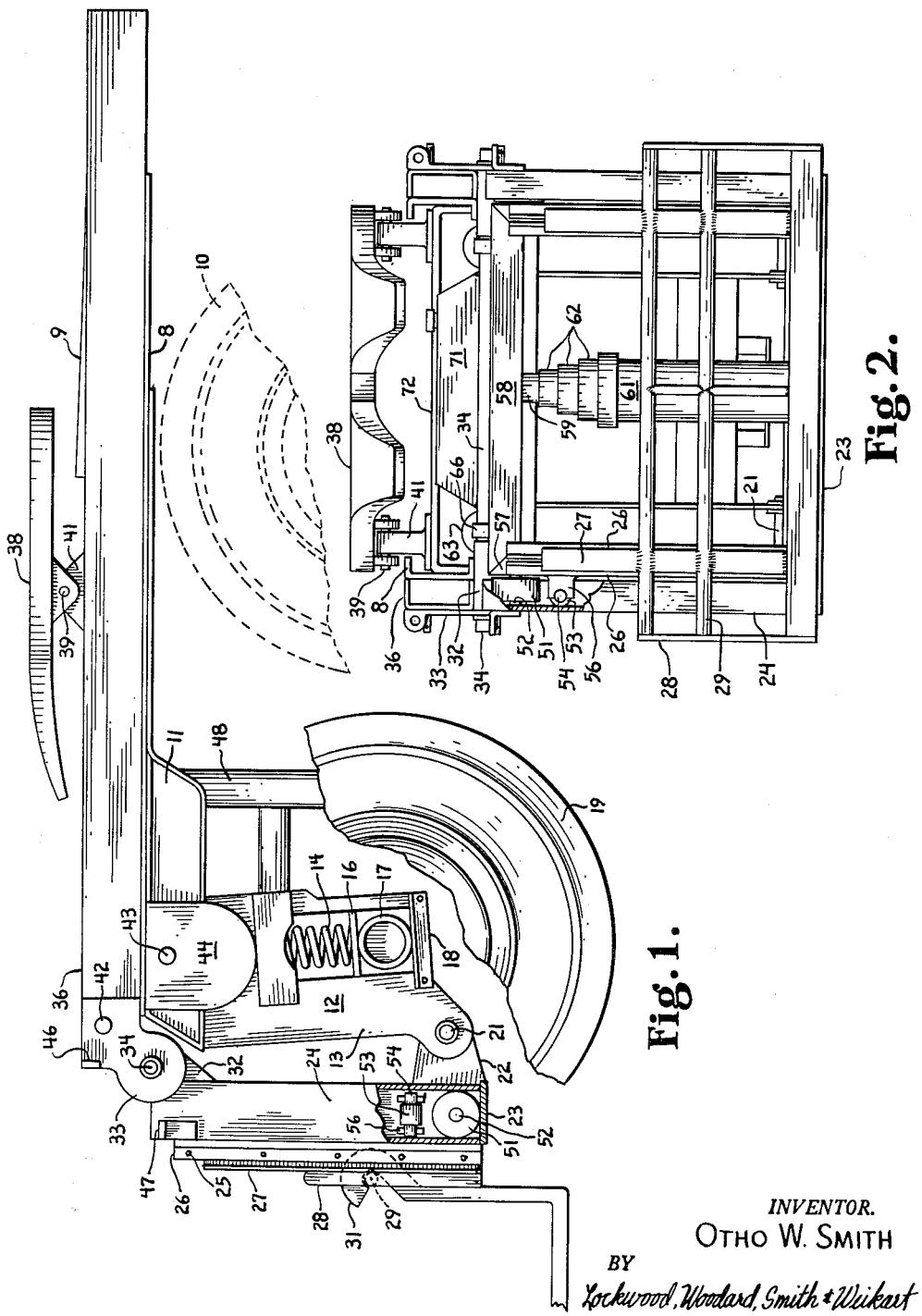
INVENTOR.
OTHO W. SMITH
BY
Lockwood, Woodard, Smith & Weikart
ATTORNEYS May 8, 1962     O. W. SMITH     3,033,400

POWER LIFT FOR TRAILER

Filed May 16, 1960     2 Sheets-Sheet 2

INVENTOR.
OTHO W. SMITH
BY
Lockwood, Woodard, Smith & Weikart
ATTORNEYS

United States Patent Office 3,033,400
Patented May 8, 1962

3,033,400
POWER LIFT FOR TRAILER
Otho W. Smith, 33 Oolitic Road, Bedford, Ind.
Filed May 16, 1960, Ser. No. 29,489
7 Claims. (Cl. 214—672)

This invention relates generally to trucking, and more specifically to trailers and the pulling, loading, and unloading thereof.

It has been of considerable concern in the trucking industry to maintain the loading on the axles of trucks and trailers within load limits established by law as well as load limits established by design considerations. It has also been of concern in the trucking industry to provide convenient and expedient means for loading and unloading trailers and semi-trailers.

The problem of axle loading has been largely alleviated by the tandem trailers disclosed in my previous patents as follows: 2,643,890, issued June 30, 1953; 2,697,614, issued December 21, 1954; 2,714,016, issued July 26, 1955; and 2,782,051, issued February 19, 1957. However, heretofore no means has been available to solve both problems. The significance of the loading and unloading problem is appreciated when one realizes that frequently truck drivers are called upon to haul heavy cargoes, such as stone slabs, steel plates, spools of wire, machinery and the like. These drivers occasionally at loading sites and frequently at unloading sites have no dock facilities or material handling equipment available to them. This is particularly true where material must be unloaded at building construction sites. Frequently a truck driver with a heavy load of building materials arrives at a building construction site and is confronted with the problem of no available means for unloading his trailer.

It is, therefore a primary object of this invention to provide means for increasing the carrying capacity of a tractor-semi-trailer combination, and particularly adapted to trailer loading and unloading operations.

It is a further object of this invention to provide means for accomplishing the primary object and having the feature of being readily convertible from semi-trailer carrying duty to trailer loading and unloading duties.

It is a further object of the present invention to accomplish the foregoing objects with a simple, neat, reliable and rugged structure.

It is a still further object of this invention to accomplish the foregoing objects with means adapted to precise control, particularly during loading and unloading operations.

The present invention provides a trailer-like unit which is adaptable to attachment to the fifth wheel of a conventional truck-tractor and which is maintained in alignment with the longitudinal axis of the truck-tractor to provide an additional load carrying axle with wheels on each side of the truck-tractor so that in combination the unit has an extra tandem set of wheels. The trailer unit of this invention, or dolly, as it will hereinafter be described, is provided with a fifth wheel unit of its own to which a semi-trailer may be attached in the manner well known of attaching a semi-trailer to the fifth wheel of a conventional truck-tractor. In this manner, the load capacity of the semi-trailer is increased.

In order to facilitate loading and unloading of the tractor, a lifting means is mounted to the rear of the dolly and constructed such that it occupies a minimum of space and causes no interference whatever to a connection between a semi-trailer and the fifth wheel of the dolly. The lifting means, which is operable in a manner similar to a a conventional fork lift truck, is capable of lifting objects to a substantial height by means of provision of extensions of the guides for the lifting unit. These extensions can be folded and unfolded by an arrangement which will be described in more detail hereinafter.

Figure 3:
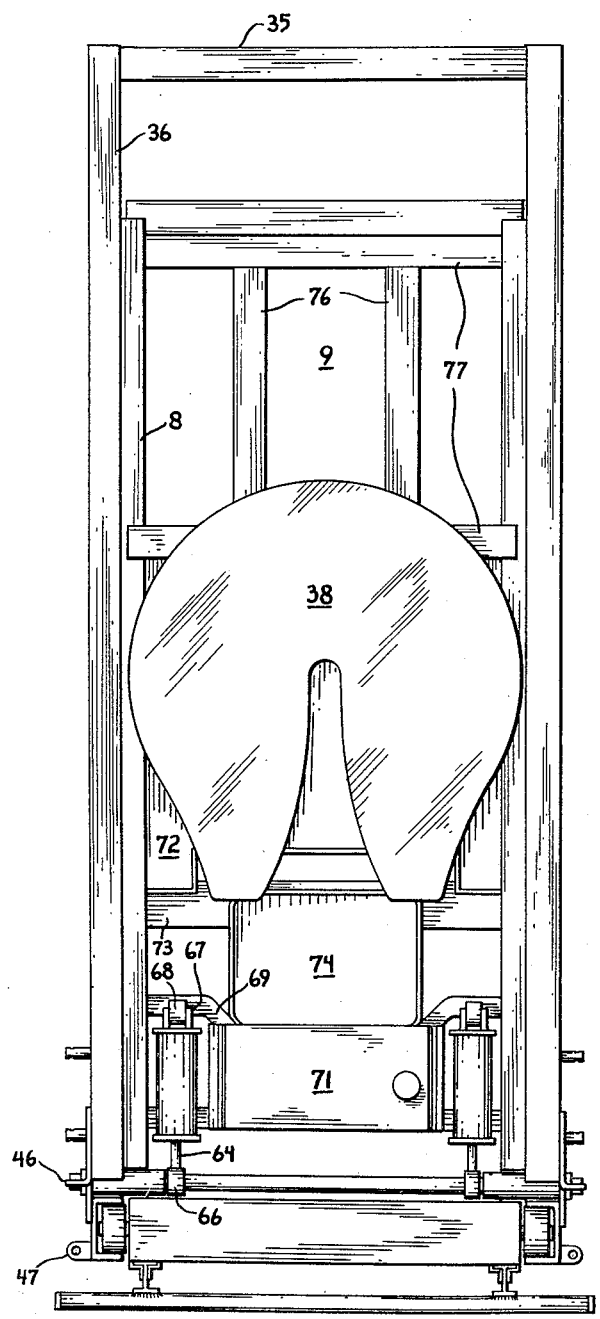
Figure 4:
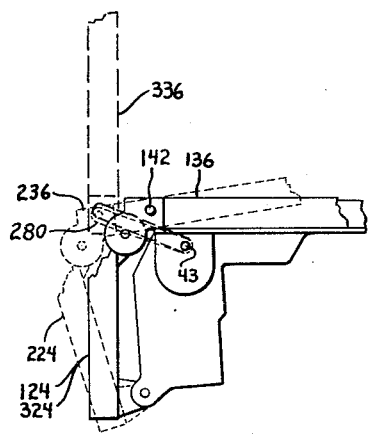

The full nature of the invention will be understood from the accompanying drawings and the following description and claims:

FIG. 1 shows a side elevation of the dolly assembly in a typical embodiment of this invention.
FIG. 2 shows a rear elevation of the embodiment shown in FIG. 1.
FIG. 3 shows a top or plan view of the embodiment shown in FIG. 1.
FIG. 4 shows in somewhat schematic form a partial side elevation illustrating the positions of various units during erection of the lifting assembly guides.
FIG. 5 shows a link which is useful in the erection and folding of the guides of the typical embodiment.

Referring to the embodiment of the invention shown in FIG. 1, there is a dolly trailer having a horizontal frame 8 with a framework 9 adapted to attach the dolly to the fifth wheel of a truck-tractor (not shown in FIG. 1). The dotted outline 10 indicates the approximate position of the rear wheel of a truck-tractor with the dolly attached to the fifth wheel of the tractor. The frame 8 has an offset portion 11 which is fastened to the suspension assembly 12 having a rear upright or axle guide plate 13. The axle 17 of the dolly supports the trailer by means of the bumper block 16 which is welded to the axle and which supports the coil spring 14 which in turn supports the frame of the dolly. The axle 17 is confined to the suspension assembly by means of the retainer 18. The axle is supported by wheels as represented by reference numeral 19.

The upright plate 13 of the suspension assembly has journals therein to support the pivot pin 21 which in turn supports the lifting assembly by means of the bracket 22 to provide a tilt axis therefor. Lifting assembly bracket 22 is fastened to a fixed base member 23, which is disposed between and affixed to the side members 24, which side members constitute guides for the lifting unit and are made of channel sections. The lifting assembly supports load arms 31 which are carried by rod 29 of the load arm apron 28. The load arm apron is normally welded to I-sections 27 which are fastened between the compound angle sections 26 by means of bolts 25 or the like. This fastening method permits selection of the position of the apron with respect to the angle sections. The angle sections are usually welded to the lifting frame (not shown in FIG. 1).

The lift guides 24 have affixed thereto journal members 32 which receive the shaft 34 to support one end of the lift guide extension channels or upper lift guides 36 by means of brackets 33 which are rotatably fastened to the shaft 34. The frame 8 supports a fifth wheel 38 by means of pins 39 and the support blocks 41. The bracket 33 has a pivot pin 42 affixed thereto. The offset portion 11 of the frame 8, having plate 44 affixed thereto, has a similar pivot pin 43 affixed to it. Projections 46 on the bracket 33 and projection 47 on the lower lift guide 24 have holes therethrough to receive a fastening means, such as a pin or a bolt, to maintain the alignment of the upper lift guide 36 with the lower lift guide 24 when the extension frame consisting of the upper lift guides is erected to the lift operating position, as will be described more extensively hereinafter.

A U-shaped tubular saddle 48 is fixed to the frame 8 and is adapted to hold the dolly structure against swinging movement with respect to the fifth wheel of the tractor (not shown) so that the tractor with the semi-trailer and the dolly interposed therebetween will not jackknife when the tractor and semi-trailer are backed up.

In FIG. 2, which shows a rear elevation of the dolly, parts which correspond to those shown in FIG. 1 are identified by the same reference numerals. The rear view of FIG. 2 shows the lifting frame having an upper cross member 58 interposed between the side members 57 to which are attached the compound angle sections 26. In FIG. 2 a portion of the lower lift guide 24 is cut away to show guide rollers for the lifting frame. Roller 51 provides fore and aft alignment of the frame with the channel 24 and is mounted on the axle 52 which is fastened to the lifting frame side member 57. Lateral alignment at the top of the lifting frame is provided by means of the roller 53 mounted on the axle 54 in the bearing block 56 which is attached to the lifting frame side member 57. The lower portion of the lifting frame is maintained in proper alignment by the same means. The cut-away portion of FIG. 1 shows the rollers used in the right-hand side of the lifting assembly near the bottom portion of the lifting frame. The roller arrangement for right and left side is the same. Vertical lifting effort is applied to the lifting frame by means of the lift cylinder 61 which has a number of telescoping sections 62 and one section 59 which is fastened to the cross member 58 of the lifting frame. The bottom of the lift cylinder is supported by the base 23 of the lifting assembly. FIG. 2 shows hydraulic cylinders 63 having piston rods 64 (not shown in FIG. 2) which operate through the couplers 66 which are pivoted on the shaft 34 to move the upper portion of the lifting assembly fore and aft.

The fifth wheel 38 is supported by the support block 41 which in turn is supported by the plate 72 mounted on the inside of frame member 8 and supported thereby.

Referring to FIG. 3, there is shown the tilting cylinders 63 together with their piston rods 64 and the coupling member 66. The pistons are mounted by means of a bracket 67 to the boss 68 which is affixed to the frame cross member 69 which is in turn fastened to the frame offset portion 11. FIG. 3 also shows in more detail the means for supporting a kingpin to attach the dolly to the fifth wheel of a truck-tractor. This means consists of the fore and aft channel sections 77 which are fastened to the frame 8 and which have the longitudinal channel sections 76 fastened between them. The kingpin, which is not shown, may be of conventional construction or may be as shown in my Patent No. 2,714,016, issued on July 26, 1955. FIG. 3 also designates by reference numeral 71 an oil reservoir and by reference numeral 74 an engine compartment.

The engine normally used is an electric starting gasoline engine which powers a hydraulic pump and is normally operated at 1800 r.p.m. Although other engines may be used and various types of hydraulic pumps may be adequate, an advantage of the self-contained engine and pump is to provide accurate and precise control of the operation of the lifting unit independently from the tractor engine. The tractor engine can thereby be used exclusively to propel the tractor-dolly combination during loading and unloading operations. This independent power supply for the lifting unit makes it unnecessary to equip the tractor with hydraulic power source and, therefore, this novel dolly may be used with any conventional tractors.

The construction of the typical embodiment of this invention adapts it to combination with any self-propelled vehicle unit having a fifth wheel type of attachment means. Conceivably, such a vehicle unit may be expressly designed for use with this dolly and have driver accommodations and steerable wheels and be proportioned for minimal turning radius, optimum driver position and other desirable features. Such vehicles could be kept in warehouses and manufacturing plants and adapted to other duties such as pulling and pushing material containers when not in use with the dolly of my invention for lifting duties. Such vehicle can be manufactured for considerably less money than conventional fork lift trucks, and where the bulk of the operations in a warehouse, yard or plant are pushing and pulling operations, such a vehicle may be found much more desirable from the economics standpoint, than conventional fork lifts. In such circumstances, the utility of the dolly of my invention, whether with such a vehicle or with a conventional truck-tractor combination, is obvious.

In FIG. 4, three positions of the lifting assembly extension are shown. All parts are designated by the reference numerals used in the preceding figures for corresponding parts, but in front of each reference numeral there is a prefix which is used to identify the part in each of the three positions. For example, the upper life guide 36 is shown in the normal folded position where it is disposed while the tractor is pulling a semi-trailer and in that position is designated by reference numeral 136. The guide is shown also in the position to which it is moved immediately prior to erection, which position has arbitrarily been designated position 2, and in this position the guide is identified by the reference numeral 236. Similarly, in the erect position of the guide 36, which position has been arbitrarily designated position 3, the guide is identified by reference numeral 336.

In order to raise the guide 36 to the position shown at 336, it is first necessary to move the lift assembly to the position designated at 224. This is accomplished by means of the tilt cylinders 63 of the preceding figures. In this position a link 80 shown in FIG. 5 and having the holes 81 in its opposite ends is fastened in place on the pins 242 and 243 by conventional means such as washers and cotter pins. When the link 80 is so positioned as designated by reference numeral 280, the pistons of the tilt cylinders 63 are retracted toward their original positions so that the lower lift guides 24 are at position 324 and during this operation the link 80 has exerted a force on the pin 42 to raise the upper lift guide 36 to the position 336. In this position the projections 46 and 47 shown in FIGS. 1, 2 and 3 meet, whereupon a bolt or other suitable fastener can be inserted through the holes therein to fasten them together to maintain the lower and upper lift guides in alignment. The links 80 may then be removed from one or both of the pins 42, 43 and the tilt cylinders can then be used to position the lift assembly for picking up and discharging objects in the manner of conventional fork lift trucks. The folding of the upper lift guides to their original position when the loading or unloading operation is completed, is accomplished in the same manner as the raising of the tracks prior to loading and unloading, but in reverse order of steps. The load arms 31 of FIG. 1 may be removed and stowed in any convenient place on the dolly or on the tractor, as desired.

As is apparent from the foregoing description, the lifting frame may be raised and lowered and the lift assembly may be tilted fore and aft by means of simple controls which may be held in one hand by the tractor driver while moving the tractor during loading and unloading operations.

Though the foregoing description has alluded to pistons and cylinders for tilting the lift assembly and raising the lifting frame, these operations may be accomplished by other means such as motors, servos, racks, and pinions, for example. Therefore, while the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A combination dolly and loader attachable to the fifth wheel of a truck tractor for carrying a semi-trailer and comprising a dolly frame, a fifth wheel coupling means on said dolly frame for connection to said tractor fifth wheel, a fifth wheel carried by said dolly for coupling it to a semi-trailer, a lower U-shaped guide frame pivotally supported at its base on said dolly frame vertically thereof, an upper U-shaped guide frame hinged at the upper end of said lower guide frame for movement into a horizontal position on the frame of said dolly or to a vertical position in alignment with said lower guide frame, an elevator slidably mounted in said lower guide frame, hydraulic means supported on said lower guide frame and coupled to said elevator for moving said elevator upwardly and downwardly in both of said guide frames when said upper frame is in its vertical position, a link pivotally connected to said dolly frame and pivotally connected to said upper guide frame between the hinge point of said upper guide frame and its upper end for creating a pivot point about which said upper guide frame moves when it is moving between its horizontal and vertical positions, and power operated means for tilting said lower guide frame about its lower pivot point to move said upper guide frame between said horizontal and vertical positions about the pivot point created by said link means.

2. A combination dolly and loader attachable to the fifth wheel of a truck tractor for carrying a semi-trailer and comprising a dolly frame, a fifth wheel coupling means on said dolly frame for connection to said tractor fifth wheel, a fifth wheel carried by said dolly for coupling it to a semi-trailer, a lower guide frame pivotally supported at its base on said dolly frame vertically thereof, an upper guide frame hinged at the upper end of said lower guide frame for movement into a horizontal position on the frame of said dolly or to a vertical position in alignment with said lower guide frame, an elevator slidably mounted in said lower guide frame, means supported on said lower guide frame and coupled to said elevator for moving said elevator upwardly and downwardly in both of said guide frames when said upper frame is in its vertical position, a link pivotally connected to said dolly frame and pivotally connected to said upper guide frame between the hinge point of said upper guide frame and its upper end for creating a pivot point about which said upper guide frame moves when it is moving between its horizontal and vertical positions, and means for tilting said lower guide frame about its lower pivot point to move said upper guide frame between said horizontal and vertical positions about the pivot point created by said link.

3. A combination dolly and loader attachable to the fifth wheel of a truck tractor for carrying a semi-trailer and comprising a dolly frame, a fifth wheel coupling means on said dolly frame for connection to said tractor fifth wheel, a fifth wheel carried by said dolly for coupling it to a semi-trailer, a lower guide frame pivotally supported at its base on said dolly frame, an upper guide frame hinged at the upper end of said lower guide frame for movement into a rest position on the frame of said dolly or to a position in alignment with said lower guide frame, an elevator slidably mounted in said lower guide frame, means supported on said lower guide frame and coupled to said elevator for moving said elevator in both of said guide frames when said upper frame is in its aligned position, a link pivotally connected to said dolly frame and pivotally connected to said upper guide frame between the hinge point of said upper guide frame and its upper end for creating a pivot point about which said upper guide frame moves when it is moving between its rest and aligned positions, and means for tilting said lower guide frame about its lower pivot point to move said upper guide frame between said rest and aligned positions about the pivot point created by said link.

4. A combination dolly and loader attachable to the fifth wheel of a truck tractor for carrying a semi-trailer and comprising a dolly frame, a lower guide frame pivotally supported at its base on said dolly frame, an upper guide frame hinged at the upper end of said lower guide frame for movement into a rest position on the frame of said dolly or to a position in alignment with said lower guide frame, an elevator slidably mounted in said lower guide frame, means supported on said lower guide frame and coupled to said elevator for moving said elevator in both of said guide frames when said upper frame is in its aligned position, a link pivotally connected to said dolly frame and pivotally connected to said upper guide frame between the hinge point of said upper guide frame and its upper end for creating a pivot point about which said upper guide frame moves when it is moving between its rest and aligned positions, and means for tilting said lower guide frame about its lower pivot point to move said upper guide frame between said rest and aligned positions about the pivot point created by said link.

5. A combination dolly and loader attachable to the fifth wheel of a truck tractor for carrying a semi-trailer and comprising a dolly frame, a lower U-shaped guide frame pivotally supported at its base on said dolly frame vertically thereof, an upper U-shaped guide frame hinged at the upper end of said lower guide frame for movement into a horizontal position on the frame of said dolly or to a vertical position in alignment with said lower guide frame, an elevator slidably mounted in said lower guide frame, hydraulic means supported on said lower guide frame and coupled to said elevator for moving said elevator upwardly and downwardly in both of said guide frames when said upper frame is in its vertical position, means for creating a pivot point about which said upper guide frame moves when it is moving between its horizontal and vertical positions, and power operated means for tilting said lower guide frame about its lower pivot point to move said upper guide frame between said horizontal and vertical positions about the pivot point created by said pivot point creating means.

6. A combination dolly and loader attachable to the fifth wheel of a truck tractor for carrying a semi-trailer and comprising a dolly frame, a fifth wheel carried by said dolly for coupling it to a semi-trailer, a lower guide frame pivotally supported at its base on said dolly frame vertically thereof, an upper guide frame hinged at the upper end of said lower guide frame for movement into a rest position on the frame of said dolly or to a position in alignment with said lower guide frame, an elevator slidably mounted in said lower guide frame, means supported on said lower guide frame and coupled to said elevator for moving said elevator upwardly and downwardly in both of said guide frames when said upper frame is in its aligned position, means for creating a pivot point on said upper frame about which said upper guide frame moves when it is moving between its rest and aligned positions, and power operated means for moving said upper guide frame between said rest and aligned positions about the pivot point on said upper frame.

7. A combination dolly and loader attachable to the fifth wheel of a truck tractor for carrying a semi-trailer and comprising a dolly frame, a lower guide frame supported on the rear end of said dolly frame vertically thereof, an upper guide frame hinged at the upper end of said lower guide frame for movement into a rest position on the frame of said dolly or into a position in alignment with said lower guide frame, an elevator slidably mounted in said lower guide frame, elevator moving means supported on said lower guide frame for moving said elevator upwardly and downwardly in both of said guide frames when said upper frame is in its aligned position, power operated means coupled to said upper guide frame for moving it between said rest and aligned positions, and independent power means carried by said dolly frame for operating said elevator moving means and said upper guide frame moving means.

References Cited in the file of this patent

UNITED STATES PATENTS 2,782,051    Smith ---------------- Feb. 19, 1957
2,910,203    Todd ----------------- Oct. 27, 1959